Figure 1:
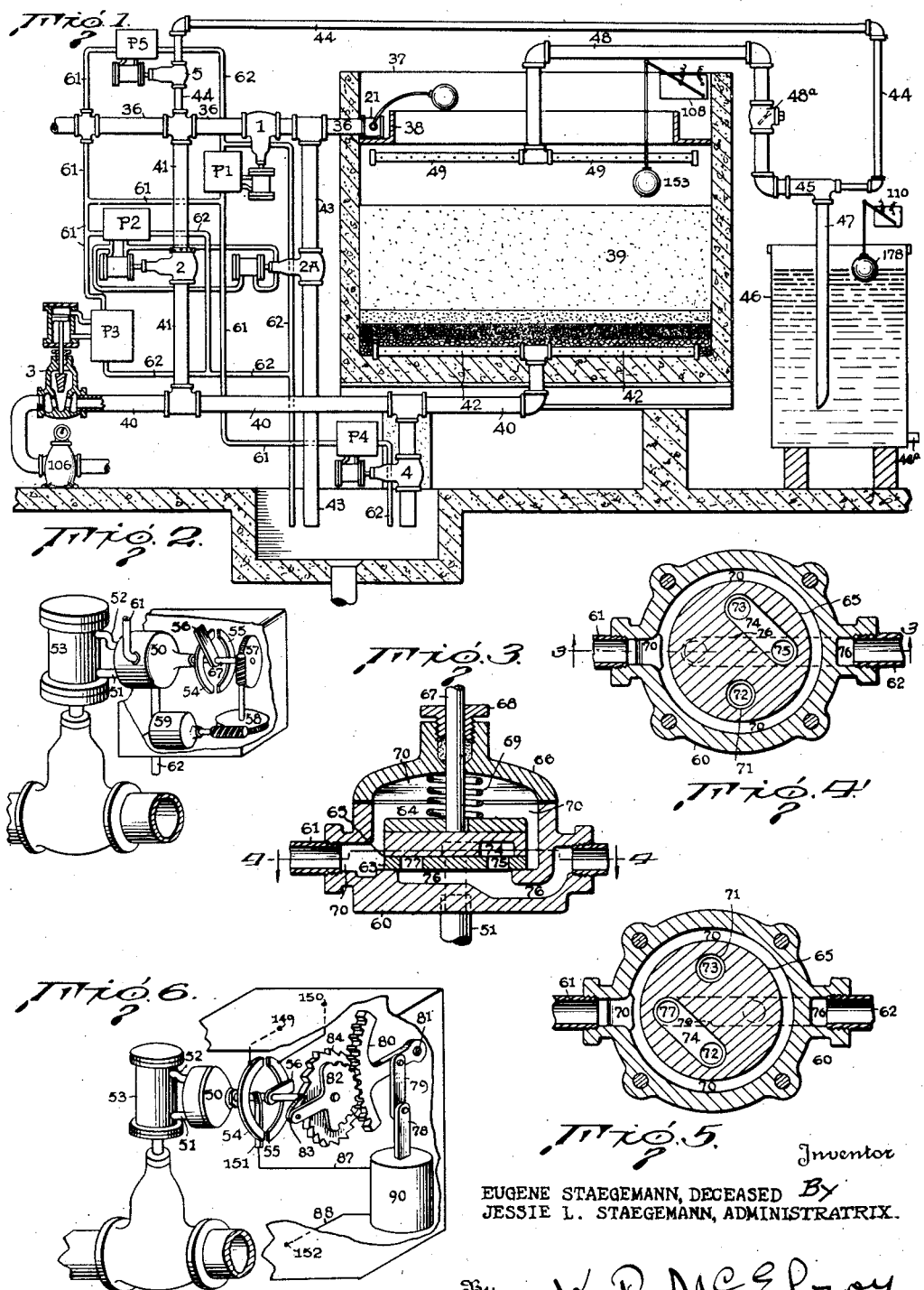

Nov. 9, 1937.  E. STAEGEMANN  2,098,893
AUTOMATIC MULTIPLE VALVE CONTROL
Filed Sept. 3, 1936  2 Sheets-Sheet 2

Inventor
EUGENE STAEGEMANN, DECEASED By
JESSIE L. STAEGEMANN, ADMINISTRATRIX.
By K. P. McElroy, Attorney Patented Nov. 9, 1937

2,098,893

UNITED STATES PATENT OFFICE 2,098,893

AUTOMATIC MULTIPLE VALVE CONTROL

Eugene Staegemann, deceased, late of Allendale, N. J., by Jessie L. Staegemann, administratrix, Allendale, N. J., assignor to The Permutit Company, New York, N. Y., a corporation of Delaware Application September 3, 1936, Serial No. 99,324

8 Claims. (Cl. 137—145)

This invention relates to automatic multiple valve control; and it comprises a system of coordinated valve operation for water treating apparatus such as large zeolite water softeners wherein plural conduit valves are provided with individual hydraulic cylinder-pistons or fluid pressure means for actuating each valve, each of the hydraulic valves is individually operated by an electrically controlled pilot valve directing the pressure fluid, individual electrical motor means operating the several pilot valves are connected in a common electric control circuit provided with individual circuit making and breaking rotary switches for the several pilot valve motor means and the individual switches are actuated by a common shaft rotated by a master control motor with a master circuit making and breaking rotor also rotated by the master control motor, switch means being also provided to energize the master control motor for rotation of the individual circuit switches to set the conduit valves; all as more fully hereinafter set forth and as claimed.

In building water treating apparatus for large scale operations such as industrial and municipal water softening and water filtering, the use of valves operated by power becomes necessary. There have been developed large rotary multiway slide valves operated by electric motors under automatic control by electrical means. Such automatic valve operation is useful and convenient. When the single multiway valve controlling a plurality of fluid conduits in a water treating unit reaches its natural limit of size, a battery of two or more units each with a single electrically operated multiway valve can be installed and coordinated control of the multiple unit battery by electrical means becomes possible.

In the present invention, a system of plural conduit valves replaces a single multiway valve in a water treating unit and the size of the single unit can be extended beyond any limitation imposed by the multiway valve. And automatic coordinated operation and control of the multiple valves by electrical means is made effective by having each valve actuated by fluid pressure means such as an hydraulic cylinder-piston worked to open and close the conduit valve by a two-way pilot valve on the pressure and exhaust lines of the hydraulic cylinder, with an individual electric motor for each of the pilot valves, and by an electrical control system in which each of the pilot-valve motors is connected in an energizing circuit through a two-way contactor on the pilot valve stem and an individual circuit making and breaking rotor or rotary switch, all of the several rotors are arranged on a common shaft, the shaft is rotated by a master control motor also rotating a master circuit making and breaking control rotor and means is provided for initially energizing the master control motor through the master rotor to initiate the required cycle of valve operations. After the initiation, the several pilot valve operations both opening and closing the hydraulic valves are controlled by various switch means either responding to flow conditions set up in the treating apparatus by the valve operations or operated by timing motors controlling flow durations. The various individual switch means are in circuit with the master circuit rotor through which the master control motor is energized to rotate the shaft actuating the individual rotary switches to close or open the various pilot valve motor circuits. By location at suitable angular positions of contact segments for circuit making and breaking switch rotors, both individual and master rotors, rotation of these rotors by the master control motor through a complete revolution of 360 degrees energizes and deenergizes the individual pilot valve motors to open and close the conduit valves in the order as required or desired for the cycle of water treating operations to be controlled. Electrical connection of the rotors to the power line is conveniently and advantageously made through a brush contacting the common shaft upon which rotor contact arms are mounted, advantageously in the same angular position. One rotor contact arm may serve to close and open a plurality of the individual rotary switches.

The automatic operation and control system as described has particular utility in making the regeneration of zeolite water softeners either fully or semi-automatic. In semi-automatic action, the master control motor may be switched on by manual means to initiate the regeneration cycle when the zeolite becomes exhausted as indicated for example by tests of the softened water effluent for hardness. In fully automatic action a time switch or means responsive to the quality of the softened water or to the quantity of water softened may be utilized to switch on the master control motor and thus to make the initiation of regeneration automatic.

In either fully or semi-automatic operation of a zeolite softening apparatus, after the control motor is initially switched on, it rotates the individual circuit rotors through an arc determined by the length of a contact strip segment in the master control rotor in contact with the rotor contact arm. When this contact is broken, the control motor stops, leaving individual rotor arms in contact with segment strips completing circuits energizing pilot valve motors to turn pilot valves working the conduit valves for the first regenerating operation. When an individual valve is set its pilot valve motor is automatically stopped by an individual circuit breaker operated by the valve motor.

After each step of the regenerating cycle, the master control motor is energized to rotate the individual circuit rotors, that is, one or more contact arms, to an angular position making proper segment contacts for switching in pilot valves to operate the conduit valves for the succeeding step, the master motor being deenergized by its circuit breaking rotor and stopped after the valve motor circuit rotors are set in the angular position for each succeeding step.

Closing of the master control motor circuit to shift the individual valve circuit rotors into each succeeding angular position can be made by switch means responding to various conditions of flow during the regeneration or the switch means may be operated by timing control motors. For example, a switch energizing the master control motor to shift the valves from brining to rinsing may be closed by a brine tank float after a predetermined proper amount of brine has been passed from the tank to the softener. The rinsing step is conveniently and advantageously controlled by a timing motor switched in by one of the pilot valve motor circuit rotors when rinsing begins and operating a cam closing a switch connected in the master control motor circuit after a predetermined time allowing a suitable rinsing flow; the closing of this switch starting the master control motor for the shift of the valve circuit rotors from the angular position for rinsing back to the softening position. A similar timing control of back-washing in a down flow softener is advantageous.

The switching means starting the master control motor for the various steps are readily reset for the next regenerating cycle by reset motor cam means connected in electric circuits energized by a reset contact rotor rotated with the valve circuit rotors to make segment contacts at suitable angular positions of the contact rotor.

In the arrangement as described, control of the valve operations is centered in the master control motor. Known means for automatic control of the softener operation can be made to control the master motor and through this the valve operation. The valves are thus electrically yoked by the individual electric motor operation of the pilot valves under control by the master motor setting the individual contact rotors to energize the valve motors.

Figure 2:
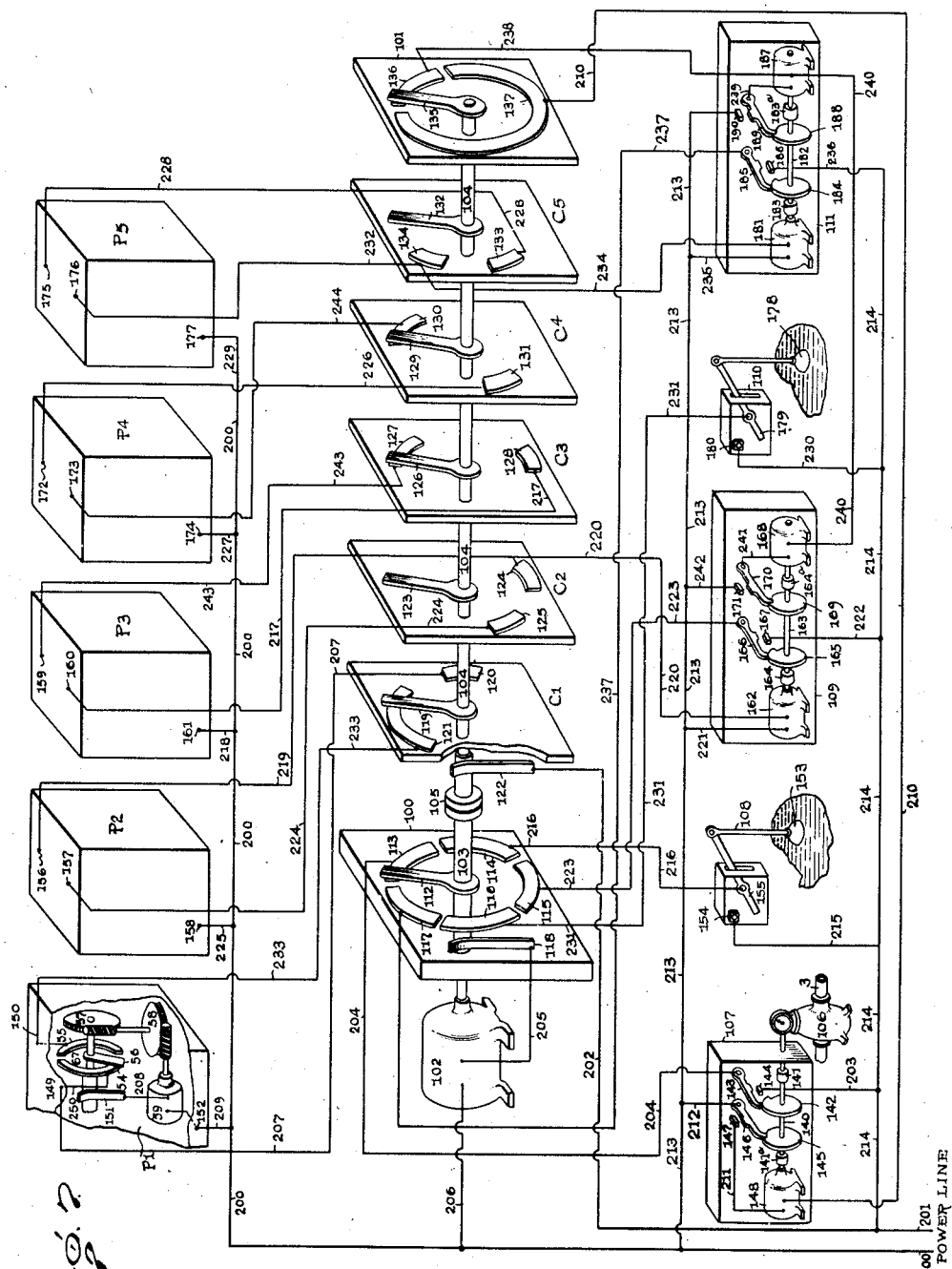

In the accompanying drawings is shown, more or less diagrammatically an automatic multiple valve control system for a zeolite water softener. In this showing, Fig. 1 is a view in elevation with parts in section of a downflow, gravity, zeolite water softener with hydraulic valves operated through individual pilot valves adapted for electrical operation under master control;

Fig. 2 shows in perspective an individual pilot valve of Fig. 1, electric motor operation of such valve and its operative connection to the hydraulic cylinder of the main valve;

Fig. 3, an axial section of the pilot valve on line 3—3 of Fig. 4, shows the principal parts thereof;

Fig. 4, a section of the pilot valve on line 4—4 of Fig. 3, shows the valve members positioned to open a main hydraulic valve of Figs. 1 and 2;

Fig. 5, a view similar to that of Fig. 4, shows the valve parts of Fig. 4 positioned to close a main hydraulic valve;

Fig. 6 shows in perspective an alternate electrical operation of the valve of Figs. 3–5, a solenoid replacing the small rotary motor of Fig. 2, and Fig. 7 shows the control system with electrical operating and control connections for the softener of Fig. 1.

The phases of operation of the softener shown in Fig. 1 include softening, draining the water contained in softener at end of softening to the level of the bed of zeolite thereby saving water, backwashing the bed of mineral to regrade and clean it, regeneration with brine solution, and finally rinsing the bed to free it of excess and spent brine.

In the softening phase, valves 1 and 3 are opened by action of pilot valves P1 and P3 admitting pressure water under the pistons of the corresponding hydraulic cylinders and valves 2, 2A, 4 and 5 are closed by virtue of pilot valves P2, P4 and P5 admitting pressure water on the top side of pistons of the corresponding hydraulic cylinders. Untreated water enters the softening tank 37 through pipe 36 (valve 1) and is distributed by trough 38. A float valve 21 may advantageously be located at the end of pipe 36 to prevent overflowing of tank 37 should the inlet flow vary or the outlet become obstructed or soft water requirements become reduced. The water flowing from trough 38 passes through the zeolite bed 39, wherein it is softened and then passes to service through pipe 40 (valve 3).

When the softening power of the zeolite bed becomes exhausted the master control system hereinafter described provides for closing valve 1 by action of pilot valve P1 admitting pressure water to the top side of the piston of the hydraulic cylinder. The water remaining in tank 37 is then drained to the level of the bed to service through pipe 40 and valve 3. This draining is terminated by a float switch 108 which energizes the master control hereinafter described to close valve 3 and open valves 2 and 2A through action of pilot valves P3 and P2 respectively, thus starting backwashing.

Backwashing of the bed is accomplished by untreated water flowing through pipe 41, valve 2, right branch of pipe 40, distributor pipes 42, thence upward through the bed, through trough 38, and backwash outlet pipe 43, valve 2A and to the sewer. If desired, the flow of water for backwashing is controlled by rate of flow controller on pipe 43 as described in the Applebaum Patent 1,443,892.

The duration of the backwashing phase is timed by an adjustable wash timer which as hereafter described at the end of a predetermined period energizes the master controller to close valves 2 and 2A through operation of pilot valve P2 and to open valves 4 and 5 for a brining operation through the action of pilot valves P4 and P5, respectively. Untreated water then enters through line 36, pipe 44 (valve 5), and into injector 45 where brine is drawn from brine tank 46 through pipe 47, and the brine solution is then passed through a check valve 48a into pipe 48 and distributed over the bed of zeolite through distributor pipes 49. The brine solution passes through the zeolite bed 39 in tank 37 and discharges through the distributor or collector pipe 42, pipe 40, and then flows to the sewer through valve 4.

The brining phase is terminated by a float switch 110 located in brine tank 46 which energizes the master controller to close valve 5 through action of pilot valve P5 and to open valve 1 for rinsing through action of pilot valve P1. The rinsing of the free and spent brine from the bed is accomplished by untreated water flowing through pipe 36, through trough 38, whence the water flows through the zeolite bed, and thence to sewer via pipes 42, pipe 40 and valve 4. The discharge from valve 4 may have a rate of flow controller to adjust the rinsing flow. The rinsing phase is terminated by an automatic adjustable rinse timer (hereinafter described) which at the end of the rinsing period energizes the master control to close valve 4 and open valve 3 which places the softener valves in position for softening.

The treated water delivered from the softener passes through a meter 106 fitted with a suitable switch automatically energizing the master control to initiate regeneration when the zeolite bed has become exhausted.

In Fig. 2 a pilot valve 50, representing pilot valves P1, P2, P3, P4 and P5, is shown with its connections 51 and 52 to a hydraulic cylinder 53 of a main valve and also with its electric drive and control. The action of the master controller in controlling the several pilot valve motors is to complete a circuit through circuit breaker contact 54 or 55 which determines the position in which the rotor of the pilot valve is stopped. In positioning the pilot valve to close the hydraulic valve, the master controller is connected electrically with circuit breaker contact 54 and the electric motor 59 is energized to drive the shaft and rotor of the pilot valve through worms and worm wheels 57 and 58 until the circuit breaker arm 56 leaves contact strip 54, thereby interrupting the circuit and stopping the valve. In positioning the pilot valve to open the hydraulic valve, the master controller arranges for electric connection to contact strip 55, thereby completing the circuit and the motor 59 then turns the pilot valve until arm 56 leaves contact strip 55, thereby interrupting the circuit and leaving the pilot valve in the open position.

In Fig. 3 the pilot valve is shown in axial section, in which view the valve body 60 is shown with pressure water connection 61, waste water connection 62, and also provided with port plate 63 and valve slide 64 faced with hard rubber surface 65. Port plate 63 has two ports 72 and 73 connected respectively, to pipes 51 and 52 running to the hydraulic cylinder. Valve bonnet 66 is constructed to provide passage for valve shaft 67 through packing gland 68 and also to receive spring 69 which holds the valve slide 64 firmly against the port plate 63. The valve is so positioned in this view as to cause the hydraulic cylinder to open the main valve. The view corresponds to that of Fig. 4 which is a plan section of the valve. Pressure water entering through pipe 61 and valve chamber 70 passes through hole 71 in slide 64 and port 72 in port plate 63 and goes to the hydraulic cylinder through pipe 51 of Fig. 2, thereby applying a pressure underneath the piston of the hydraulic cylinder and causing the piston to move upward, thus opening the hydraulic valve. Waste water from the top side of the piston passes through pipe 52 of Fig. 2, through port 73 of the port plate, through cavity 74 of the valve slide, thence through a port 75 in the port plate and out waste pipe 62 via cavity 76 in body 60.

In Fig. 5, a plan section is shown of the pilot valve positioned to close the hydraulic valve. In this position, turned 180 degrees from that of Fig. 4, pressure water entering chamber 70 through pipe 61 passes through hole 71 in slide 64, port 73 in the port plate and out pipe 52 to the top side of the piston of the hydraulic cylinder. Waste water from the under side of the piston passes through pipe 51 into the valve, through port 72 of the port plate, cavity 74 of the slide, a port 77 in the port plate and through to waste pipe 62 via cavity 76 of body 60.

Fig. 6 corresponds to Fig. 2 with the exception of the electric motor means provided for turning the rotor of the pilot valve. In this modification a solenoid-spring motor 90 operating through a gear sector and pinion and ratchet wheel and pawl is shown as replacing the electric motor 59 and worms and worm wheels of Fig. 2. As in the case of the motor 59 in Fig. 2 when the master controller makes electric connection with contact strip 54, the solenoid positions the pilot valve to close the hydraulic valve and when contact is made with strip 55, the hydraulic valve is opened. When contact is made with either of these strips, a circuit is completed through the solenoid 90 so as to draw plunger 78 and connecting link 79 downward. This action rotates gear sector 80 about its axis 81, thereby rotating pinion 82, about the shaft 67 of the pilot valve upon which it is loosely pivoted. Rotation of the pinion causes pawl 83 to engage a tooth of ratchet wheel 84 and rotate it. Ratchet 84 being firmly fastened to the shaft 67 of the pilot valve causes rotation of the slide 64 of the pilot valve to the next position, whereat the contact arm 56 leaving the contact strip connected to the controller breaks the circuit through solenoid 90, thereby permitting the plunger 78 and connecting link 79 to be moved upward by a spring (not shown). The gear sector 80 is then rotated in the opposite direction as is gear pinion 82, causing pawl 83 to disengage ratchet wheel 84. The proportions of the mechanism are such that each time the solenoid 90 is energized the ratchet wheel 84 and the slide of the pilot valve rotate exactly 180°, gears 80, 82 and pawl 83 returning to zero position on deenergizing the solenoid.

Fig. 7 shows a complete electrical apparatus necessary for fully automatic operation of the softener and includes the master controller which consists of master control motor 102, rotary circuit breaker 100 for the control motor, rotary circuit switches C1, C2, C3, C4 and C5 which control the action of pilot valves P1, P2, P3, P4 and P5, respectively, meter 106 on the service line controlled by valve 3, meter switch 107, softener float switch 108, wash timer 109, brine tank float switch 110, rinse timer 111, and reset contact rotor 101, which latter device provides for resetting the meter switch, wash timer and rinse timer. This control apparatus is shown in the position corresponding to the return of the softener to the softening phase.

The rotary circuit breakers or make and break rotary switches 100, C1, C2, C3, C4, C5 and 101 are driven by the electric motor 102 through shafts 103 and 104, which two shafts are electrically insulated from each other by coupling 105. The contact arms of the several rotor switches, as shown, namely 112, 119, 123, 126, 129, 132, and 135, have the same angular position on the substantially common shaft rotated by master control motor 102.

In the meter switch 107, water flowing through meter 106 causes the meter head mechanism to rotate shaft 140 through one-way drive (free wheeling drive) 141. Rotation of shaft 140 turns meter switch cam 142 until, when the softening capacity of the bed is exhausted by passage of a predetermined quantity of water, arm 143 is released by cam 142 and makes contact with contact 144. This initiates regeneration by completing an electrical circuit through wires 201, 214, 203, contacts 143 and 144, wire 204, contact strip 113 of circuit breaker 100, circuit breaker arm 112, shaft 103, circuit breaker brush 118, wire 205, motor 102, wires 206 and 200. The master motor 102 starts and turns all the circuit breaker rotor arms through a certain angle until the master circuit is broken by arm 112 leaving contact strip 113, when the motor stops, leaving arm 112 in contact with strip 114.

Rotation of the individual contact rotor arms by shaft 104 causes contact arm 119 of individual rotor switch C1 to make contact with contact strip 120. By this action an electrical circuit is completed through wires 201, 202, circuit breaker brush 122, shaft 104, arm 119, strip 120, wire 207, binding post 149, wire 250, contact strip 54 of pilot valve P1, contact arm 56, brush 151, wire 208, motor 59, binding post 152 and wires 209 and 200. This completed electrical circuit causes operation of pilot valve control motor 59 until contact arm 56 leaves strip 54, thereby breaking the electrical circuit through the control motor after having rotated the pilot valve 180°. This causes pilot valve P1 to close hydraulic valve 1 and initiates the draining of the softening tank 37 down to the bed as before described. The pilot valve motor 59 stops itself with the valve in closed position.

As the softener is drained to the bed, float 153 of float switch 108 drops and causes arm 155 to contact the contact point 154. An electrical circuit is now completed through wires 201, 214, 215, contacts 154 and 155, wire 216, master rotor contact strip 114, contact arm 112, brush 118, wire 205, motor 102, and wires 206 and 200. This circuit energizes motor 102 to operate and rotate the contact rotor arms until arm 112 leaves strip 114, thereby breaking the electrical circuit and initiating backwashing.

As contact arm 112 leaves strip 114 stopping motor 102 in the backwashing position of the rotor arms, contact arm 126 of rotor switch C3 meets contact strip 128 and contact arm 123 of rotor switch C2 meets contact strip 124. Contact arm 126 meeting strip 128 completes an electrical circuit through wires 201 and 202, brush 122, shaft 104, contact arm 126, strip 128, wire 217, binding post 160 of pilot valve P3, thence through the electrical circuit of pilot valve P3, binding post 161, wires 218 and 200. In the same manner in which pilot valve P1 closed valve 1, pilot valve P3 closes valve 3. The valve is automatically stopped in closed position. At the same time an electrical circuit for pilot valve P2 is completed from wire 201 to contact strip 124, wire 219, binding post 156 of pilot valve P2, thence through the electrical motor apparatus of the pilot valve P2, binding post 158 and wires 225 and 200. Pilot valve P2 then opens hydraulic valves 2 and 2A, starting the backwashing of the softener, the valves remaining in open position.

Contact arm 123, making contact with strip 124 of rotor switch C2, thus starting backwashing, also completes an electrical circuit through the backwash timer 109 from wire 201 to strip 124, wire 220, wash timing motor 162, and wires 221, 213 and 200. This circuit causes timing motor 162 to operate, thereby rotating its shaft 163 through one-way (free wheeling) drive 164. Rotation of shaft 163 turns wash timing cam 165 until time for backwashing has expired when contact arm 166 meets contact point 167. An electrical circuit is now completed between wires 201, 214, 222, contacts 167 and 166, wire 223, contact strip 115 of master contact rotor 100, contact arm 112, shaft 103, brush 118, wire 205, motor 102 and wires 206 and 200. This circuit energizes motor 102 to operate until contact arm 112 leaves strip 115, whereupon the circuit is broken, stopping motor 102 and leaving the individual contact rotor arms positioned to start the brining.

In this position contact arm 123 of rotor switch C2 makes contact with strip 125, contact arm 129 of rotor C4 makes contact with strip 131, and arm 132 of rotor C5 makes contact with strip 133. Contact between arm 123 and strip 125 completes the circuit from wire 201 to strip 125, wire 224, binding post 157 and the electrical apparatus of pilot valve P2, binding post 158, and wires 225 and 200. This circuit energizes the motor 59 of pilot valve P2 to close hydraulic valves 2 and 2A, and thus to stop the backwashing. Contact of arm 129 with strip 131 completes the circuit from wire 201 through wire 226 to binding post 172 and the electrical apparatus of pilot valve P4, binding post 174, and wires 227 and 200, energizing the motor 59 of pilot valve P4 to open valve 4, and similarly contact between arm 132 and strip 133 completes a similar circuit through the motor means of pilot valve P5 via wire 228, binding post 175 and electrical apparatus of pilot valve P5, binding post 177 and wires 229 and 200, causing valve 5 to open. Brine flow to the zeolite bed 39 is thus started. The valves 4 and 5 are stopped in open position.

As brine is drawn from the brine tank 46 and injected into the softener, float 178 of float switch 110 falls with the brine level and is so adjusted that when the proper quantity of brine has been drawn, arm 179 of the float switch makes contact with point 180. This contact completes a circuit through wire 201, wire 214, wire 230, contacts 179 and 180, wire 231, contact strip 116 of master contact rotor 100, arm 112, brush 118, wire 205, motor 102 and wires 206 and 200. The master control motor 102 now rotates until contact arm 112 leaves strip 116, again breaking the circuit, stopping the motor and positioning the contact arms to start the rinsing phase.

As arm 112 leaves strip 116, arm 132 of rotor switch C5 makes contact with strip 134 and completes an electrical circuit through the mechanism of pilot valve P5 via wire 232 to binding post 176, and from binding post 177 via wires 229 and 200, and closes valve 5. At the same time contact arm 119 for pilot valve P1 makes contact with strip 121 and completes an electrical circuit through the motor means of pilot valve P1 via wire 233, binding post 150, contact strip 55 and arm 56, brush 151, motor 59, and wires 209 and 200. This latter circuit causes motor 59 to turn the pilot valve and arm 56 until arm 56 leaves strip 55, interrupting the circuit after having rotated the pilot valve 180°, in which position valve 1 is opened. Opening valve 1 permits water to flow through the softener for rinsing purposes.

As arm 132 contacts strip 134 in rotor C5, an additional circuit is completed through the rinsing timer 111 from wire 201 via brush 122 to strip 134, wire 234, rinse timing motor 181, wires 235, 213 and 200. The resulting operation of motor 181 turning shaft 182 through one-way drive 183 causes rinse timer cam 184 to release arm 185 after a predetermined interval of time, whereupon arm 185 meets contact point 186. The release of arm 185 by cam 184 occurs at the time when sufficient rinse water has passed through the softener to remove unused and spent brine. An electrical circuit is now completed through wires 201 and 214, contacts 185 and 186, wire 237, contact strip 117 and the driving motor 102. This circuit causes the driving motor to operate and rotate the contact arms of the rotor switches until arm 112 leaves strip 117, breaking the circuit, stopping the motor, and positioning the contact arms to return the softener valves to softening position.

When contact arm 112 leaves strip 117, arm 129 of rotor switch C4 meets strip 130, completing a circuit through the pilot valve P4's motor mechanism to close drain valve 4, and arm 126 of rotor switch C3 meets strip 127 completing a circuit energizing pilot valve P3 to open valve 3. Valve 1 being already open, softening is resumed.

Resetting of meter switch 107 for initiating the succeeding regeneration is accomplished at the beginning of the draining phase. When master contact rotor arm 112 leaves strip 113 as draining is started, arm 135 of the reset contact rotor switch 101 meets strip 137, thereby completing an electrical circuit from wire 201 to strip 137 through wire 210, reset motor 148, wire 211, contacts 146 and 147 (which are closed when contacts 143 and 144 meet), and wires 212, 213 and 200. Motor 148 then operates and turns shaft 140 through a second one-way (free wheeling) drive 141a until reset cam 145 releases arm 146, thereby breaking circuit and stopping the motor in such a position that the meter 106 will again release arm 143 to contact point 144 and initiate regeneration when the proper quantity of water has passed through the softener and the meter.

Resetting of wash timer 109 and of rinse timer 111 is accomplished when the softener is returned to softening phase, because when arm 112 leaves strip 117, arm 135 of the reset contactor meets strip 136, thereby completing an electrical circuit from wire 201 through brush 122 and shaft 104 to strip 136, wire 238, reset motor 187, wire 239, contacts 189 and 190 (which are closed when contacts 185 and 186 are closed), wires 213 and 200, and a second circuit through wires 239 and 240, reset motor 168, wire 241, contacts 170 and 171 (which are closed when contacts 166 and 167 meet), wires 242, 213 and 200. The first mentioned circuit causes motor 187 to turn shaft 182 through a second one-way (free wheeling) drive 183a until reset cam 188 releases arm 189 separating contacts 189 and 190, and opening the circuit of motor 187 which thereby stops in such position that when rinse timing motor 181 again operates, the rinse time is correct. The second circuit causes motor 168 to turn shaft 163 through a second one-way (free wheeling) drive 164a so that reset cam 169 releases arm 170 thereby breaking the circuit between contacts 170 and 171, and stopping the motor 168 so that cam 165 is properly positioned to correctly time the backwash period when motor 162 next operates.

The circuit through the softener float switch 108 is broken at the beginning of the wash phase, because float 153 rises with the level of the water in the softening tank and contacts 155 and 154 are broken. The circuit through the brine float switch 110 is broken early in the rinsing period when more brine solution is admitted to the brine tank 46 through the small pipe 46a (see Fig. 1), thereby causing float 178 to rise as the brine tank is automatically refilled from storage. This action breaks the circuit through contacts 179 and 180. Means for automatic refilling of the brine tank 46 is described in the copending application of Eugene Staegemann Serial No. 708,653; now matured into Patent No. 2,051,155, granted August 18, 1936.

In the above description of the individual pilot valve motor switches and their actuation by the master control motor, a plurality of individual rotor switch arms in the same angular position have been shown for the sake of clarity. The principle of coordinated pilot valve control by the master motor is the same when the contact segments of a plurality of the pilot valve switches are arranged to be contacted by a single rotor arm, thus eliminating a number of parts and simplifying the construction. As a matter of fact, there are various suitable types of switch means, other than the contact segment and rotor type shown, that may be used in the individual pilot valve motor circuits.

The backwash timer 109 and the rinse timer 111 may be consolidated in a single timing device provided with two cam contactor switches for the master control motor and with one reset cam contactor for the reset motor circuit.

Other types of pilot valves may replace the construction illustrated in Figs. 3, 4, 5. For example, four individual pilot valves may be yoked together and actuated by a single motor to coordinate the plural valve operation.

The automatic plural valve actuation and control system as described is readily adaptable to control of apparatus involving a plurality of various fluid flows; in particular water softeners and filters of either gravity or pressure type and operating with any desired cycle of reconditioning flows.

What is claimed is:

1. A coordinated valve operation and automatic control system comprising a plurality of conduit valves, individual fluid pressure devices for operating said valves, individual pilot valves actuating said fluid pressure devices, individual electrical motor means for operating each of said pilot valves, electrical circuits for energizing said motors, individual circuit making and breaking switch means for each of said motor circuits, actuating means for each of said switches arranged on a shaft, a master control motor for rotating said shaft and switch actuating means to make and break said electrical circuits, a circuit making and breaking control rotor on said shaft with electrical circuit connections for energizing and deenergizing said master control motor to rotate said shaft and switch means in electrical series with said master control rotor for starting said master control motor.

2. In an automatic water softener operated by a plurality of conduit valves, individual fluid pressure devices for operating said valves, individual pilot valves having pressure fluid connections for directly actuating said fluid pressure devices, individual electric motor means for operating each of said pilot valves for said direct fluid pressure valve operation, electrical circuits for energizing said motor means, individual electrically operated switching means for closing and opening said circuits and electrical control means for said electrically operated means setting the conduit valves in operation.

3. An automatically operated and controlled plural valve system comprising a plurality of conduit valves operated by individual hydraulic cylinder-pistons, individual pilot valves having hydraulic fluid connections for directly actuating said cylinder-pistons, individual electrical motor means for operating said pilot valves for said direct hydraulic valve operation, individual circuit closing rotor switches for said pilot valve motors, a master control motor actuating said individual switches, circuit breaking means controlling said master control motor and operated thereby and switching means for energizing the master control motor through said circuit breaking means to actuate said individual switches and thereby to operate and control the conduit valves.

4. In automatic water treating apparatus, a plurality of conduit valves operated by individual hydraulic means, individual rotary pilot valves actuating said individual hydraulic valves and rotated by individual electric motors arranged to be deenergized upon rotation of the pilot valves by their respective motors through predetermined angles, individual circuit making rotors for energizing each pilot valve motor, a master control motor rotating said individual rotors to energize the pilot valve motors in setting the conduit valves, control of said valve settings being by control of said master motor, means for controlling the master motor.

5. In an automatic water softener operated by a plurality of conduit valves, individual fluid pressure devices for actuating said valves, individual pilot valves controlling said fluid pressure devices, individual electric motor means for operating each of said pilot valves, electric circuits for said motor means, individual switches in said several circuits for separately energizing and deenergizing each of said motor means, electrical power means for actuating said individual switches, an additional electrical circuit for energizing said power means and switch means in said additional electrical circuit for setting said conduit valves in operation.

6. The combination of claim 5, the switch means for the power means comprising in electrical series connection therewith a circuit breaking device operated by said power means to position said conduit valves and a circuit closing device operated by a water meter for starting said power means for conduit valve operation.

7. The combination of claim 5, said switch means for the power means comprising in electrical series connection therewith a circuit breaking device operated by said power means to position said conduit valves and a circuit closing device operated by a float to start said power means for conduit valve actuation.

8. The combination of claim 5, said switch means for the power means comprising in electrical series connection therewith a circuit breaking device operated by said power means to position said conduit valves and a circuit closing device operated by a time responsive mechanism to start said power means for conduit valve actuation.

JESSIE L. STAEGEMANN,
*Administratrix of the Estate of Eugene Staegemann, Deceased.*